(No Model.)

F. G. BERON.
CROSSOVER INSULATOR.

No. 550,673. Patented Dec. 3, 1895.

WITNESSES
H. A. Lamb
S. V. Richardson

INVENTOR
Frank G. Beron
By A. M. Wooster
Atty.

UNITED STATES PATENT OFFICE.

FRANK G. BERON, OF WATERBURY, CONNECTICUT, ASSIGNOR OF ONE-HALF TO JAMES F. GAFFNEY, OF SAME PLACE.

CROSS-OVER INSULATOR.

SPECIFICATION forming part of Letters Patent No. 550,673, dated December 3, 1895.

Application filed February 18, 1895. Renewed October 4, 1895. Serial No. 564,675. (No model.)

*To all whom it may concern:*

Be it known that I, FRANK G. BERON, a citizen of the United States, residing at Waterbury, in the county of New Haven and State of Connecticut, have invented certain new and useful Improvements in Cross-Over Insulators; and I do hereby declare the following to be a full, clear, and exact description of the invention, such as will enable others skilled in the art to which it appertains to make and use the same.

My invention has for its object to provide a durable, inexpensive, and absolutely-safe cross-over insulator for electric wires.

With this end in view my invention consists in the novel construction which I will now describe, referring by letters and numbers to the accompanying drawings, forming part of this specification, in which—

Figure 1:
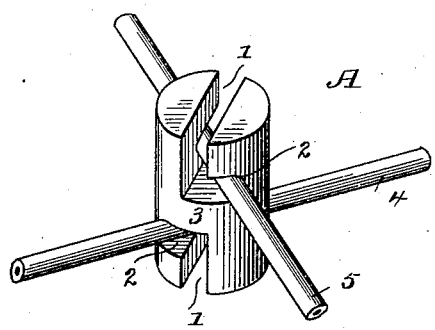
Figure 2:
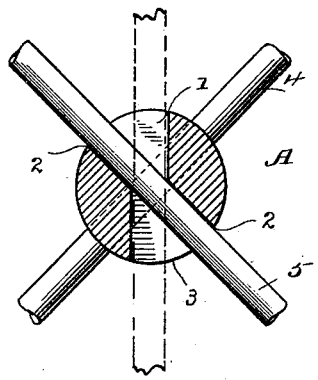
Figure 3:
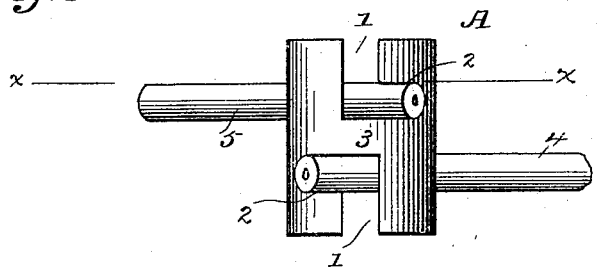

Figure 1 is a perspective illustrating my novel cross-over insulator in use; Fig. 2, a section on the line *x x* in Fig. 3; and Fig. 3 is a side elevation.

A denotes my novel insulator as a whole, which is a block formed from any suitable insulating material—as, for example, porcelain, glass, hard rubber, or vulcanized fiber. Upon the upper and lower sides of the block are slots 1, and at the inner ends of these slots are lateral slots 2 which extend in opposite directions, said lateral slots being widest at their outer ends and running out in the slots 1. The slots are made of a suitable size to receive the styles of wire which it is desired to use, it being deemed preferable that the wire should lie closely in the slots, so as to prevent friction. It will of course be understood that the depth of the slots 2 is not of the essence of my invention and that it makes no difference at what angle the wires cross each other. In the drawings I have shown wires crossing each other at a right angle. It is simply necessary that the slots be made deep enough to hold the wire securely. The inner ends of the slots 1 and of the pairs of slots 2 are separated from each other by a wall 3 of the material of the block, slots 1 being shown as in line with each other and the pairs of slots 2 at an angle to each other.

In use one of the wires will ordinarily be made tight before the insulator is applied. Suppose, for example, that the lower wire which I have indicated by 4 is made tight. The insulator is placed over it, the wire lying in the lower slot 1. The upper wire which I have designated by 5 is placed in the upper slot 1 and is then tightened up, the effect of which is to give to the insulator a partial turn on the lower wire, so that the lower wire will lie in the lower lateral slots 2 and the upper wire will lie in the upper lateral slots 2, each wire being thus held in the insulator by two independent bayonet-joints. It will thus be seen that the two wires and the insulator coact to retain each other firmly and securely in place.

Having thus described my invention, I claim—

A cross over insulator consisting of a block of insulating material having on opposite sides slots 1 and at the inner ends of said slots lateral slots 2 said slots 1 and the pairs of lateral slots being separated from each other by a wall of the material of the block so that when the wires are placed in slots 1 and tightened at an angle to each other the block will be turned and the crossed wires will pass into the respective pairs of lateral slots, said wires and the insulator acting to retain each other in place and the wires being separated by the wall.

In testimony whereof I affix my signature in presence of two witnesses.

FRANK G. BERON.

Witnesses:
 NATHL. R. BRONSON,
 GEO. E. TERRY.